US008486564B2

(12) United States Patent
Nagai et al.

(10) Patent No.: US 8,486,564 B2
(45) Date of Patent: Jul. 16, 2013

(54) METHOD OF PRODUCING ACTIVE MATERIAL PARTICLES WITH LITHIUM TRANSITION METAL OXIDE SECONDARY PARTICLES

(75) Inventors: Hiroki Nagai, Nagoya (JP); Masahiro Morita, Toyota (JP); Kensaku Mori, Niihama (JP); Shin Imaizumi, Niihama (JP); Kenji Ikeuchi, Niihama (JP); Toshiyuki Osako, Niihama (JP); Hiroyuki Toya, Niihama (JP)

(73) Assignees: Toyota Jidosha Kabushiki Kaisha, Toyota-shi, Aichi-ken (JP); Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 13/618,526

(22) Filed: Sep. 14, 2012

(65) Prior Publication Data

US 2013/0011331 A1   Jan. 10, 2013

Related U.S. Application Data

(62) Division of application No. 13/513,209, filed as application No. PCT/JP2010/067691 on Oct. 7, 2010.

(30) Foreign Application Priority Data

Dec. 2, 2009   (JP) ................................ 2009-274381

(51) Int. Cl.
*H01M 4/13*   (2010.01)
(52) U.S. Cl.
USPC ................... 429/223; 429/231.95; 429/231.3; 423/594.3; 423/594.4

(58) Field of Classification Search
USPC ............... 429/231.95, 223, 231.3; 423/594.3, 423/594.4
See application file for complete search history.

(56) References Cited

U.S. PATENT DOCUMENTS

| | | | |
|---|---|---|---|
| 5,702,845 A | 12/1997 | Kawakami et al. | |
| 6,086,843 A * | 7/2000 | Ovshinsky et al. | ........ 423/594.3 |
| 6,270,924 B1 | 8/2001 | Yamashita et al. | |
| 7,384,706 B2 | 6/2008 | Suhara et al. | |

(Continued)

FOREIGN PATENT DOCUMENTS

| | | |
|---|---|---|
| EP | 0 854 526 A2 | 7/1998 |
| JP | 8-321300 | 12/1996 |

(Continued)

OTHER PUBLICATIONS

International Search Report in International Application No. PCT/JP2010/067691; Mailing Date: Dec. 28, 2010.

(Continued)

*Primary Examiner* — Zachary Best
(74) *Attorney, Agent, or Firm* — Finnegan, Henderson, Farabow, Garrett & Dunner, LLP

(57) ABSTRACT

Active material particles are provided that exhibit performance suitable for increasing the output of a lithium secondary battery and little deterioration due to charge-discharge cycling. The active material particles provided by the present invention have a hollow structure having secondary particles including an aggregate of a plurality of primary particles of a lithium transition metal oxide, and a hollow portion formed inside the secondary particles, and through holes that penetrates to the hollow portion from the outside are formed in the secondary particles. BET specific surface area of the active material particles is 0.5 to 1.9 $m^2/g$.

11 Claims, 6 Drawing Sheets

5μm

U.S. PATENT DOCUMENTS

| | | |
|---|---|---|
| 2006/0068289 A1 | 3/2006 | Paulsen et al. |
| 2006/0081818 A1* | 4/2006 | Ito et al. ............... 252/500 |
| 2006/0134521 A1* | 6/2006 | Shima ................ 429/231.1 |

FOREIGN PATENT DOCUMENTS

| | | |
|---|---|---|
| JP | 10-74516 | 3/1998 |
| JP | 10-74517 | 3/1998 |
| JP | 10-83816 | 3/1998 |
| JP | 10-255804 | 9/1998 |
| JP | 2000-323123 | 11/2000 |
| JP | 2000-340226 | 12/2000 |
| JP | 2004-253174 | 9/2004 |
| JP | 2005-123179 | 5/2005 |
| JP | 2006-89364 | 4/2006 |
| JP | 2008-266136 | 11/2008 |
| JP | 2009-259605 | 11/2009 |

OTHER PUBLICATIONS

Office Action for U.S. Appl. No. 13/513,209 dated Jan. 7, 2013.

* cited by examiner

5μm

1μm

METHOD OF PRODUCING ACTIVE MATERIAL PARTICLES WITH LITHIUM TRANSITION METAL OXIDE SECONDARY PARTICLES

This is a divisional of application Ser. No. 13/513,209, filed on Jul. 26, 2012, which is a national stage of PCT/JP2010/067691, filed Oct. 7, 2010, which claims priority to Japanese Application No. 2009-274381, filed on Dec. 2, 2009. The contents of each of these application are incorporated herein by reference.

TECHNICAL FIELD

The present invention relates to active material particles for a lithium secondary battery, a production method thereof, and a lithium secondary battery provided with the active material particles.

BACKGROUND ART

A lithium secondary battery is known that is provided with positive and negative electrodes having materials (active materials) capable of reversibly storing and releasing lithium (Li), and which is charged and discharged by the migration of lithium ions between the electrodes. The demand for this type of lithium secondary battery is continuing to increase for use as a vehicle-mounted power supply or as power supplies of personal computers, portable terminals and the like. In particular, since lithium ion batteries are lightweight and allow the obtaining of high energy density, they are expected to be preferably used as high-output, vehicle-mounted power supplies.

A typical example of an active material used in an electrode (typically, a positive electrode) of a lithium secondary battery is a complex oxide containing lithium and a transition metal element. For example, a lithium complex oxide at least containing nickel (Ni) as the transition metal element (nickel-containing lithium complex oxide) having a layered structure is used preferably. Patent Documents 1 to 4 are examples of technical documents relating to active materials of lithium secondary batteries.

PRIOR ART

Patent Document

Patent Document 1: Japanese Patent Application Laid-open No. H8-321300
Patent Document 2: Japanese Patent Application Laid-open No. H10-74516
Patent Document 3: Japanese Patent Application Laid-open No. H10-83816
Patent Document 4: Japanese Patent Application Laid-open No. H10-74517

DISCLOSURE OF THE INVENTION

Problem to be Solved by the Invention

There are some applications of lithium secondary batteries in which the lithium secondary battery is presumed to be used in a state in which it is repeatedly discharged at a high rate (rapid discharge). A lithium ion battery used as a motive power source of a vehicle (such as a lithium ion battery installed in a hybrid vehicle that combines the use of a lithium ion battery as a motive power source and another motive power source having a different operating principle in the manner of an internal combustion engine) is a representative example of a lithium secondary battery that is presumed to be used in this manner. However, even though typical conventional lithium ion batteries demonstrate comparatively high endurance in the case of low-rate charge-discharge cycling, they are known to be susceptible to deterioration of performance (such as an increase in internal resistance) in the case of charge-discharge cycling including a high rate of discharge.

Patent Document 1 describes a technology for composing a negative electrode or positive electrode of a lithium secondary battery from an active material having a porous hollow structure. According to this active material having a porous hollow structure, since the contact surface area with electrolyte solution is increased thereby facilitating movement of lithium ions, and strain attributable to increased volume of the active material by insertion of lithium is suppressed, a lithium battery can be obtained that enables rapid charging, has high capacity and has a long life. In addition, Patent Documents 2 to 4 describe that, by using complex oxide particles in the form of hollow, spherical secondary particles formed by the aggregation of primary particles and having a large number of gaps on the surface thereof that lead to the inside (lithium cobalt complex oxide particles or spinel-type lithium manganese complex oxide particles) as a positive electrode active material, contact surface area with a non-aqueous electrolyte solution increases and utilization rate of the positive electrode active material can be improved.

However, when a lithium secondary battery is actually produced using these active material particles having a porous structure, there were cases in which effects for improving battery performance were unable to be obtained as expected. In addition, conventional active material particles having a porous structure tended to be susceptible to deterioration of performance particularly with respect to a high-rate charge-discharge cycling as previously described. Consequently, in comparison with lithium secondary batteries obtained by using active material particles having a typical dense structure, even if effects that reduce reaction resistance are obtained at the time the battery is started to be used (an advantageous effect for increasing battery output), as high-rate charging and discharging are repeated, performance conversely ends up becoming poor, thereby making these active material particles unsuitable for use as the active material of a lithium secondary battery for a vehicle power supply and the like.

Therefore, an object of the present invention is to provide active material particles for a lithium secondary battery that demonstrate performance suitable for increasing battery output and suffer little deterioration attributable to charge-discharge cycling (and particularly charge-discharge cycling including high-rate discharge). Another object of the present invention is to provide a production method of the active material particles. Still another object of the present invention is to provide a lithium secondary battery obtained by using the active material particles.

Means of Solving the Problems

According to the present invention, active material particles for a lithium secondary battery are provided. The active material particles have a hollow structure having secondary particles including an aggregate of a plurality of primary particles of a lithium transition metal oxide, and a hollow portion formed inside the secondary particles. In the secondary particles, through holes that penetrates to the hollow portion from the outside are formed. The BET specific surface area of the active material particles is roughly 0.5 m²/g to 1.9 m²/g.

Active material particles that demonstrate a hollow form having through holes (holed hollow structure) and satisfy the requirement regarding BET specific surface area described above can be used in an electrode (typically, a positive electrode) of a lithium secondary battery, and are able to yield a battery that stably demonstrates higher performance. For example, a lithium secondary battery can be constructed that has low internal resistance (or in other words, favorable output characteristics) and demonstrates little increase in internal resistance attributable to charge-discharge cycling (particularly, charge-discharge cycling that includes high-rate discharge). If the BET specific surface area of the active material particles is excessively small, effects of improving battery performance (for example, the effect of reducing internal resistance) tend to decrease. On the other hand, if the specific surface area is excessively large, the effect of inhibiting deterioration attributable to charge-discharge cycling tends to decrease. According to preferable holed hollow active material particles that satisfy the requirement regarding specific surface area disclosed herein, improvement of high-rate characteristics (for example, at least one of inhibition of increases in resistance caused by high-rate cycling in the manner of a high-rate cycling test to be subsequently described, and improvement of high-rate discharge performance), and prevention of wear deterioration (for example, at least one of inhibition of increases in resistance with respect to endurance cycle in the manner of an endurance test to be subsequently described, and improvement of capacity retention rate) can be realized simultaneously.

In the present specification, "lithium secondary battery" refers to a secondary battery using lithium ions as electrolyte ions in which charging and discharging are realized by the movement of charge accompanying lithium ions between the positive electrode and the negative electrode. In general, batteries referred to as a lithium ion battery are typical examples that are included in the lithium secondary battery in the present specification.

In a preferable aspect of the active material particles disclosed herein, the opening width of the through holes is on average 0.01 µm or more. Here, the opening width of the through holes refers to the length extending across the narrowest portion of a path extending to the hollow portion over which the through holes penetrate the secondary particles from the outside of the active material particles. According to active material particles having this structure, since the opening width of the through holes (to also be referred to as the "opening size") lies within a suitable range, electrolyte solution is able to easily enter the hollow portion from the outside by passing through the through holes. Thus, in a lithium secondary battery provided with these active material particles, effects of improving battery performance by having a holed hollow structure (such as the effect of reducing internal resistance) can be suitably demonstrated. An average value of the above-mentioned opening size (average opening size) can be obtained by, for example, ascertaining a portion or all of the opening sizes of through holes possessed by at least ten active material particles, and then determining the arithmetic average thereof.

In another preferable aspect of the active material particles disclosed herein, the average hardness of the active material particles is roughly 0.5 MPa or more. Here, average hardness of the active material particles refers to the value obtained by measuring dynamic hardness under conditions of a loading speed of 0.5 mN/sec to 3 mN/sec using a flat diamond indenter having a diameter of 50 µm. In this manner, active material particles having a holed hollow structure and high average hardness (or in other words, high shape retention) can be used in an electrode (typically, a positive electrode) of a lithium secondary battery, and are able to yield a battery that stably demonstrates higher performance. For example, a lithium secondary battery can be constructed that has low internal resistance (or in other words, favorable output characteristics) and demonstrates little increase in internal resistance attributable to charge-discharge cycling (particularly, charge-discharge cycling that includes high-rate discharge).

The number of the through holes per particle of the active material particles is preferably about 1 to 20 on average. According to active material particles having this structure, since the number of through holes lies within a suitable range, in a lithium secondary battery provided with these active material particles, a desired average hardness can be easily secured while suitably demonstrating effects of improving battery performance (such as the effect of reducing internal resistance) as a result of having a holed hollow structure. Thus, favorable battery performance can be more stably demonstrated (such as by inhibiting deterioration caused by charge-discharge cycling). The value of the above-mentioned average number of through holes is obtained by, for example, ascertaining the number of through holes per particle for at least ten active material particles, and then determining the arithmetic average thereof.

The average particle diameter of the above-mentioned active material particles is preferably within the range of roughly about 3 µm to 10 µm. In addition, the average opening size of the above-mentioned through holes is preferably ½ or less of the average particle diameter of the active material particles. Since the average opening size lies within a suitable range, active material particles having this structure are able to easily secure a desired average hardness while suitably demonstrating effects of improving battery performance (such as the effect of reducing internal resistance) as a result of having a holed hollow structure. Thus, favorable battery performance can be demonstrated more stably.

In a typical aspect of the active material particles disclosed herein, primary particles that compose holed hollow secondary particles as previously described are mutually sintered. According to these active material particles, a desired average hardness can be easily secured. Thus, favorable battery performance can be demonstrated more stably. For example, in a portion of the secondary particles that surrounds a hollow portion, the primary particles that compose the secondary particles are densely sintered so that there are substantially no gaps at the grain boundaries of the primary particles except for the portions of the through holes. For example, in the case of observing a cross-section of the active material particles with a scanning electron microscope (SEM) at a magnification factor that makes it possible to measure the opening size of the through holes, there are preferably substantially no gaps observed at the grain boundaries of the primary particles other than the portions of the through holes. According to these active material particles, a lithium secondary battery can be constructed that stably demonstrates better high-rate characteristics.

The above-mentioned lithium transition metal oxide is preferably a compound having a layered structure that contains nickel as a constituent element (to also be referred to as a "Ni-containing Li oxide"). According to active material particles having this composition, a lithium secondary battery can be constructed that demonstrates higher performance. For example, a compound having a layered structure containing nickel, cobalt and manganese as constituent elements thereof (to also be referred to as an "LiNiCoMn oxide") can be preferably employed.

According to the present invention, a lithium secondary battery is also provided that is obtained by using any of the active material particles disclosed herein. This lithium secondary battery is typically provided with a positive electrode, a negative electrode and a non-aqueous electrolyte solution. At least one of the positive electrode and the negative electrode (preferably the positive electrode) is an electrode containing a hollow active material having any of the active material particles disclosed herein. A lithium secondary battery having this configuration has low internal resistance and is able to demonstrate only a small increase in resistance attributable to charge-discharge cycling (particularly, charge-discharge cycling that includes high-rate discharge).

Since the lithium secondary battery provided with the active material particles disclosed herein is able to have superior output characteristics and endurance, it is preferable for use as a lithium secondary battery installed in a vehicle (such as a lithium secondary battery used as driving power supply of a vehicle). For example, the lithium secondary battery can be preferably used as a power supply for a motor of a vehicle such as an automobile in the form of an assembled battery in which a plurality of the lithium secondary batteries are connected in series. Thus, according to the present invention, a vehicle is provided that is provided with a lithium secondary battery having any of the active material particles disclosed herein (and can be active material particles produced according to any of the methods disclosed herein).

According to the present invention, a method for producing active material particles having a holed hollow structure is also provided. These active material particles have secondary particles formed by the aggregation of a plurality of primary particles of a lithium transition metal oxide, and a hollow portion formed inside the secondary particles. A through hole that penetrates from the outside to the hollow portion is formed in the secondary particles. The active material particles can be preferably used as a constituent material of a non-aqueous secondary battery such as a lithium secondary battery (typically, a lithium ion battery). The above-mentioned active material particle production method includes a step of supplying ammonium ions to an aqueous solution (typically a water-based solution) of a transition metal compound, and precipitating particles of the transition metal hydroxide from the aqueous solution (raw material hydroxide formation step). Here, the aqueous solution contains at least one transition metal element that composes the lithium transition metal oxide. The production method also includes a step of mixing the transition metal hydroxide with a lithium compound to prepare an unfired mixture (mixing step). Moreover, the production method includes a step of calcining the mixture to obtain the active material particles (calcining step). Here, the raw material hydroxide formation step includes a stage in which the transition metal hydroxide is precipitated from the aqueous solution at pH 12 or higher and an ammonium ion concentration of 25 g/L or less (nucleation stage), and a stage in which the precipitated transition metal hydroxide is grown at a pH less than 12 and an ammonium ion concentration of 3 g/L or more (particle growth stage). According to this production method, active material particles having a holed hollow structure can be suitably produced. This production method can be preferably employed as, for example, a method for producing any of the active material particles disclosed herein.

The above-mentioned calcining step is preferably carried out such that the maximum calcining temperature is 800° C.
to 1100° C. As a result, since the primary particles can be adequately sintered, active material particles having a desired average hardness can be preferably produced. This calcining step is preferably carried out so that, for example, secondary particles are formed in which gaps are not present at the grain boundaries of the primary particles at portions other than the hollow portion and the through holes.

In a preferable aspect of the active material particle production method disclosed herein, the calcining step includes a first calcining stage, in which the mixture is fired at a temperature T1 of 700° C. to 900° C., and a second calcining stage, in which the result of the first calcining stage is fired at a temperature T2 of 800° C. to 1100° C. that is higher than the calcining temperature T1 of the first calcining stage. As a result of calcining the mixture in an aspect that includes these first and second calcining stages, preferable active material particles having a holed hollow structure disclosed herein can be suitably produced.

According to the present invention, a method for producing an electrode for a lithium secondary battery is also provided having a configuration in which an electrode mixture layer is retained on a sheet-shaped current collector. This method includes a step of preparing an electrode mixture composition containing any of the active material particles disclosed herein and a solvent that disperses the active material particles. In addition, this method includes a step of applying the electrode mixture composition to a current collector. In addition, this method includes a step of forming an electrode mixture layer by drying the applied composition and pressing. The active material particles disclosed herein are able to have strength that is able to withstand the above-mentioned pressing despite having a holed hollow structure. According to these active material particles, a holed hollow structure suitable for improving battery performance can be more favorably maintained in an electrode (preferably a positive electrode) produced according to the above-mentioned method and in a lithium secondary battery constructed using that electrode. Thus, a lithium secondary battery can be provided that demonstrates higher performance.

The matters disclosed by this specification include those indicated below.

A lithium secondary battery provided with a positive electrode, a negative electrode and a non-aqueous electrolyte solution, wherein the positive electrode has active material particles having a holed hollow structure that have secondary particles formed by the aggregation of primary particles of a lithium transition metal oxide and a hollow portion formed in the inside thereof, and through holes are formed in the secondary particles that penetrate to the hollow portion from the outside, and the lithium secondary battery satisfies one or two or more of the following characteristics:

(1) a resistance increase rate is 3-fold or less (preferably 2-fold or less and more preferably 1.2-fold or less) as determined in a high-rate cycle test carried out under conditions described in experimental examples to be subsequently described, (2) an increase rate of low-temperature (−30° C.) reaction resistance is 2-fold or less (preferably 1.1-fold or less, more preferably 1.05-fold or less and even more preferably 1.03-fold or less) as determined in an endurance cycle test carried out under conditions described in experimental examples to be subsequently described, (3) a capacity retention rate is 90% or more as determined in an endurance cycle test carried out under conditions described in experimental examples to be subsequently described, and (4) a low-temperature (−30° C.) initial reaction resistance is 3Ω or less (preferably 2Ω or less) as measured under conditions described in experimental examples to be subsequently described.

Any of the active material particles disclosed herein can be preferably employed as active material particles having a holed hollow structure as described above. A battery that satisfies at least (1) of the above-mentioned characteristics (1) to (4) is preferable, while a battery that satisfies at least (1) and (2) is more preferable.

DESCRIPTION OF EMBODIMENTS

Figure 1:
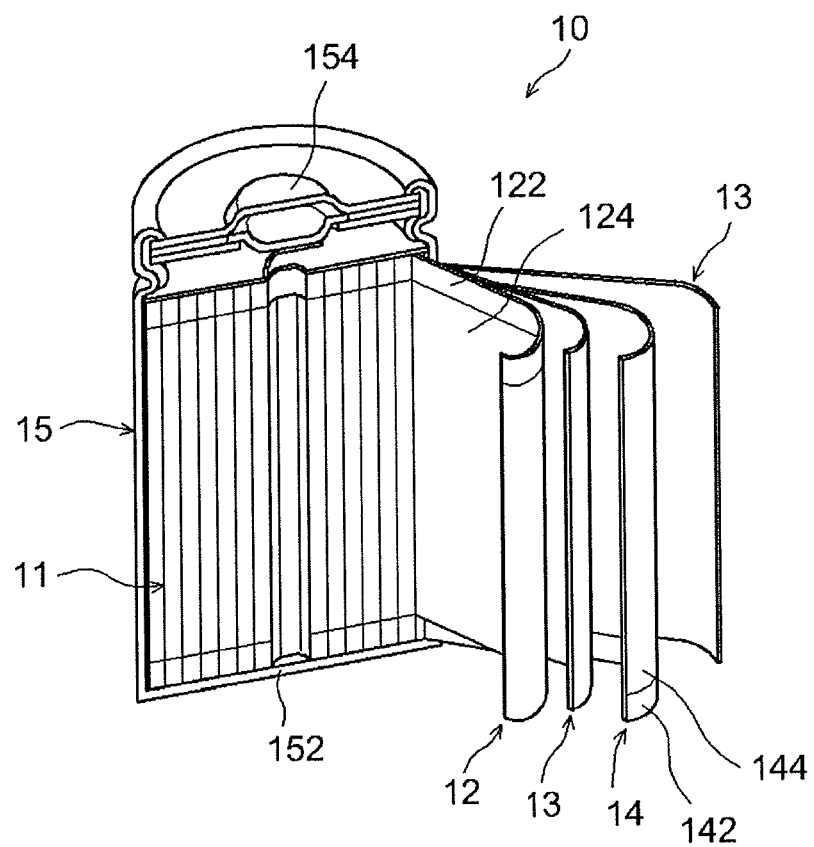
FIG. 1 is a partial cross-sectional view schematically showing the configuration of a cylindrical lithium secondary battery according to an embodiment.

The following provides an explanation of preferred embodiments of the present invention. Those matters required to carry out the present invention, with the exception of those matters specifically mentioned in the present specification, can be understood to be design matters of a person with ordinary skill in the art based on the prior art in the relevant technical field. The present invention can be carried out based on the contents disclosed in the present specification and common general technical knowledge in the relevant field.

The active material particles disclosed herein can be applied to various lithium secondary batteries configured so that the particles are able to function as an electrode active material. The active material particles are particularly preferably applied to a lithium secondary battery provided with a liquid non-aqueous electrolyte (namely, a non-aqueous electrolyte solution). The above-mentioned active material particles can be used as a positive electrode active material or negative electrode active material by combining with the active material of the counter electrode. Among these, the active material particles are more preferably used as a positive electrode active material.

Although the following provides a more detailed explanation of the present invention by mainly using as an example the case of applying to the positive electrode active material of a lithium secondary battery (and typically, a lithium ion battery), this is not intended to limit the scope of the present invention.

The material of the active material particles disclosed herein can be various types of lithium transition metal oxides capable of reversibly storing and releasing lithium. Examples include lithium transition metal oxides having a layered structure and lithium transition metal oxides having a spinel structure that are used in the positive electrodes of typical lithium secondary batteries. Examples of lithium transition metal oxides having a layered structure include oxides at least containing nickel (nickel-containing lithium complex oxides), oxides at least containing cobalt and oxides at least containing manganese for the above-mentioned transition metal.

A preferable example of a lithium transition metal oxide having a layered structure is a nickel-containing lithium complex oxide (Ni-containing Li oxide). This Ni-containing Li oxide can also contain one type or two or more types of other metal elements other than Li and Ni (namely, transition metal elements and/or typical metal elements other than lithium and nickel). For example, one type or two or more types of metal elements other than Li and Ni selected from the group consisting of Al, Cr, Fe, V, Mg, Ti, Mo, Cu, Zn, Ga, In, Sn, La and Ce can be contained. Ni-containing Li oxides in which the main component of the transition metal element is Ni, or those containing Ni and one type or two or more types of other transition metal elements (such as Co and Mn) at roughly the same ratio, are preferable.

A preferable example of the composition of the active material particles disclosed herein is a layered Ni-containing Li oxide represented by the following general formula (I):

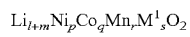
$$Li_{1+m}Ni_pCo_qMn_rM^1{}_sO_2 \quad (I).$$

In the above formula (I), $M^1$ can be one type or two or more types of metal elements selected from the group consisting of Al, Cr, Fe, V, Mg, Ti, Zr, Nb, Mo, Ta, W, Cu, Zn, Ga, In, Sn, La and Ce. m can be a number that satisfies the expression $0 \leq m \leq 0.2$. p can be a number that satisfies the expression $0.1 \leq p \leq 0.9$. q can be a number that satisfies the expression $0 \leq q \leq 0.5$. r can be a number that satisfies the expression $0 \leq r \leq 0.5$. s can be a number that satisfies the expression $0 \leq s \leq 0.02$. Here, typically p+q+r+s=1. In a preferable aspect, $0 \leq s < p$. s may also be 0 (namely, an oxide that does not contain $M^1$).

A preferable example of an Ni-containing Li oxide is an oxide at least containing Co and Mn (LiNiCoMn oxide). For example, an LiNiCoMn oxide in which $0 < q \leq 0.5$ and $0 < r \leq 0.5$ in the above-mentioned formula (I) is preferable. A first element among Ni, Co and Mn (element contained in the largest amount based on the number of atoms thereof) is preferably any of Ni, Co and Mn. In a preferable aspect, the above-mentioned first element is Ni. In another preferable aspect, the contents of Ni, Co and Mn based on the numbers of atoms thereof are roughly equal.

The active material particles disclosed herein are holed hollow active material particles having a hollow structure having secondary particles and a hollow portion formed in the inside thereof, and wherein through holes are formed in the secondary particles that penetrate to the hollow portion from the outside. The secondary particles have a form that is formed by aggregation of primary particles of a lithium transition metal oxide as previously described (and preferably, an oxide having a layered structure such as a layered Ni-containing Li oxide).

In a preferable aspect of the active material particles disclosed herein, the average hardness of the active material particles is roughly 5 MPa or more. Here, average hardness of the active material particles refers to a value obtained by measuring dynamic hardness under conditions of a loading speed of 0.5 mN/sec to 3 mN/sec using a flat diamond indenter having a diameter of 50 μm. An arithmetic average obtained by carrying out the above-mentioned measurement on at least ten active material particles is preferably employed for the average hardness. Active material particles having this average hardness enable the construction of a lithium secondary battery that stably demonstrates higher performance.

If the hardness of the active material particles (which can also be understood to be the compressive strength of the particles) is inadequate, the structure of the active material particles may be disrupted thereby preventing the demonstration of desired effects due to stress which could be applied during the battery production process (such as when adjusting the electrode mixture composition to be subsequently described, pressing an electrode mixture layer, transporting or winding an electrode sheet) or stress which could be applied due to volume changes in the electrode mixture layer accompanying charging and discharging of the battery (compressive force). Phenomena in which the structure of the active material particles is disrupted by stress applied due to charging and discharging as described above can cause a battery using active material particles employing a conventional porous structure to have increased susceptibility to deterioration by charge-discharge cycling. In batteries provided with a wound electrode body in which sheet-shaped electrodes are tightly wound (for example, those wound into a cylindrical shape) and batteries used in a form in which stress is applied in the side direction to the winding axis (batteries used in the form of an assembled battery in which a plurality of batteries are arranged in the side direction), stress attributable to charging and discharging as described above can have a particularly large effect on battery deterioration. Active material particles having a preferable average hardness disclosed herein favorably demonstrate effects of improving battery performance (such as the effect of reducing internal resistance) as a result of having a holed hollow structure, and allow the construction of a lithium secondary battery having a superior ability to maintain those effects (endurance).

The number of through holes possessed by the secondary particles is preferably roughly 20 or less (for example, 1 to 20) and more preferably roughly 1 to 10 (for example, 1 to 3) per particle of the active material particles on average. Active material particles having a holed hollow structure that have this average number of through holes are clearly distinguishable in terms of structure from active material particles having a conventional porous structure (namely, a structure having a large number of pores), such as porous hollow particles having a porous outer shell or porous particles in which the entire particle is formed to be porous (sponge-like).

If the above-mentioned average number of through holes is excessively large, the secondary particles become brittle, making it difficult to maintain a hollow shape. Active material particles having a preferable average number of through holes disclosed herein are able to favorably and stably demonstrate effects that improve battery performance (such as the effect of reducing internal resistance) as a result of having a holed hollow structure while securing strength of the secondary particles (and in turn, the active material particles).

The above-mentioned through holes are preferably formed so as to connect the outside of the active material particles with the hollow portion via a comparatively short path. In a preferable aspect thereof, 50% or more (more preferably 70% or more, and for example, 80% or more and even 90% or more) of through holes appearing in a cross-section of the active material particles penetrate the outer shell of the active material particles so that the outside of the active material particles and the hollow portion can be connected with a straight line that passes through the through holes. Through holes in the form of such paths are preferable since electrolyte solution is able to easily enter and leave the hollow portion through the through holes due to their small flow resistance.

The number of through holes in the form of paths leading to the hollow portion by penetrating the outer shell of the active material particles nearly perpendicularly is preferably 50% or more (more preferably 75% or more, and for example, 90% or more). Active material particles having an average of 1 to 20 of these through holes (for example, 1 to 10 through holes) per particle are preferable.

In a typical aspect of the active material particles disclosed herein, the above-mentioned through holes have an average diameter (namely, opening size) of roughly 0.01 µm or more at the narrowest portion thereof. This average opening size is preferably roughly 0.02 µm or more and more preferably roughly 0.05 µm or more. As a result of having through holes of this opening size, effects of improving battery performance by having a holed hollow structure can be suitably demonstrated. On the other hand, if the average opening size is excessively large, the strength of the active material particles may decrease easily. The preferable upper limit of average opening size may differ according to the average particle diameter of the active material particles. Normally, the average opening size is preferably roughly ½ or less and more preferably roughly ⅓ or less (for example, ¼ or less) the average particle diameter of the active material particles. In addition, the average opening size of the through holes preferably does not exceed roughly 2.5 µm regardless of the average particle diameter of the active material particles. This average opening size is particularly preferable for active material particles in which the average number of through holes is roughly 1 to 20 (and preferably about 1 to 10).

The above-mentioned characteristic values such as the average number of through holes, the path shape of the through holes and the average opening size can be determined by, for example, observing a cross-section of the active material particles with an SEM. For example, a sample obtained by solidifying the active material particles or a material containing the active material particles in a resin (and preferably, a thermosetting resin) may be cut at a suitable cross-section and that cross-section may be observed with an SEM while slicing off sections thereof. Alternatively, since the direction (orientation) of active material particles in the above-mentioned sample can normally be assumed to be generally random, the above-mentioned characteristic values can be calculated by statistically processing SEM observation results obtained from a single cross-section or a comparatively small number of about 2 to 10 cross-sections.

In a typical aspect of the active material particles disclosed herein, primary particles that compose the above-mentioned secondary particles are mutually sintered. Such active material particles are able to demonstrate high shape retention (resistance to collapse, and can be reflected in, for example, a high average hardness or high compressive strength). Thus, such active material particles are able to more stably demonstrate favorable battery performance.

In a preferable aspect thereof, primary particles that compose the secondary particles are densely sintered in the portion of the secondary particles that surrounds the hollow portion, with the exception of the portions having the through holes. For example, the primary particles are preferably sintered so that there are substantially no gaps at the grain boundaries of the primary particles in SEM observations. Such active materials particles are preferable since they allow the obtaining of high shape retention in particular.

According to holed hollow active material particles in which the primary particles are densely sintered as described above (typically, densely sintered at least to a degree that prevents a typical non-aqueous battery electrolyte solution from passing through), the locations where electrolyte solution is able to flow between the outside of the particles and the hollow portion are limited to those locations where there are through holes. This is one of the factors behind the active material particles disclosed herein being able to demonstrate the effect of improving high-rate cycling characteristics of a lithium secondary battery. Namely, for example, in a battery in which a positive electrode, of a configuration in which a positive electrode mixture layer composed mainly of an active material is held by a sheet-shaped current collector, is wound with a sheet-shaped separator and a negative electrode, when the battery is repeatedly charged and discharged, electrolyte solution is squeezed from the electrode body (and particularly the positive electrode mixture layer) due to expansion and contraction of the active material accompanying charging and discharging, thereby resulting in a shortage of electrolyte solution in a portion of the electrode body and causing a decrease in battery performance (such as output performance). According to active material particles having the configuration described above, since electrolyte solution in the hollow portion is inhibited from flowing out from portions other than the through holes, the problem of a shortage of electrolyte solution in the positive electrode mixture layer can be prevented or diminished. As a result, increases in resistance during high-rate cycling can be suppressed. This effect can be demonstrated particularly favorably by active material particles in which the average number of through holes per particle is about 1 to 20 (and preferably, 1 to 10).

The active material particles disclosed herein preferably have a BET specific surface area within the range of roughly $0.5 \, m^2/g$ to $1.9 \, m^2/g$. If the specific surface area is excessively small, effects of improving battery performance in a lithium secondary battery provided with the active material particles are prone to diminish. For example, the effect of improving reaction resistance (particularly, reaction resistance at low temperatures) tends to diminish. On the other hand, if the specific surface area is excessively below the above-mentioned range, the degree of deterioration caused by charge-discharge cycling (particularly, charge-discharge cycling that includes a high rate of discharge) is prone to increase. Holed hollow active material particles in which the BET specific surface area is within the range of $1.2 \, m^2/g$ to $1.9 \, m^2/g$ allow the construction of a lithium secondary battery that demonstrates more favorable battery performance. For example, at least one effect among a low rate of increase in resistance due to high-rate cycling, a low initial reaction resistance (particularly, initial reaction resistance at low temperatures), resistance to increases in the reaction resistance even after going through charge-discharge cycling, and a high capacity retention rate relative to charge-discharge cycling can be realized. A value obtained by measuring according to an ordinary nitrogen adsorption method can be employed for the value of specific surface area.

The average particle diameter of the active material particles is preferably roughly 2 μm or more (for example, roughly 2 μm to 25 μm). If the average particle diameter is excessively small, effects of improving battery performance are prone to diminish due to the small volume of the hollow portion, and the outer shell of the active material particles becomes thin when adequate volume of the hollow portion is attempted to be secured, thereby resulting in increased susceptibility to a decrease in strength of the active material particles. The average particle diameter is more preferably roughly 3 μm or more. In addition, from the viewpoint of active material particle productivity and the like, the average particle diameter is preferably roughly 25 μm or less and more preferably roughly 15 μm or less (for example, roughly 10 μm or less). In a preferable aspect thereof, the average particle diameter of the active material particles is roughly 3 μm to 10 p.m. A value obtained by measuring according to typical laser diffraction particle size analysis (median value (D50: 50% volume average particle diameter) can be employed for the value of average particle diameter of the active material particles.

Although there are no particular limitations thereon, the tap density of the active material particles disclosed herein may be within the range of roughly $0.7 \, g/cm^3$ to $2.5 \, g/cm^3$. Active material particles having a tap density of roughly $1 \, g/cm^3$ to $2 \, g/cm^3$ are preferable. According to these active material particles, a lithium secondary battery can be constructed that demonstrates more favorable high-rate cycling characteristics. A value measured in compliance with JIS K5101 can be employed for the value of tap density.

Any of the holed hollow active material particles disclosed herein can be produced by, for example, precipitating a hydroxide of a transition metal under suitable conditions from an aqueous solution containing at least one transition metal element contained in a lithium transition metal oxide that composes the active material particles (and preferably, all transition metals other than lithium contained in the oxide), and mixing the transition metal hydroxide with a lithium compound followed by calcining. Although the following provides a detailed explanation of an embodiment of this active material particle production method by using as an example the case of producing holed hollow active material particles composed of LiNiCoMn oxide and having a layered structure, this explanation is not intended to limit the application target of this production method to holed hollow active material particles composed in this manner.

The active material particle production method disclosed herein includes a step of supplying ammonium ions ($NH_4^+$) to an aqueous solution of a transition metal compound and precipitating particles of transition metal hydroxide from the aqueous solution (raw material hydroxide formation step). The solvent (aqueous solvent) that composes the aqueous solution is typically water, and may also be a mixed solvent composed mainly of water. An organic solvent able to uniformly mix with water (such as a lower alcohol) is preferable as a solvent other than water that composes the mixed solvent. The aqueous solution of the transition metal compound (to also be referred to as a "transition metal solution") contains at least one (preferably all) transition metal element (here, Ni, Co and Mn) that composes the lithium transition metal oxide corresponding to the composition of the lithium transition metal oxide that composes the active material particles targeted for production. For example, a transition metal solution is used that contains one type or two or more types of compounds that are capable of supplying Ni ions, Co ions and Mn ions to the aqueous solvent. Examples of compounds serving as the source of these metal ions that can be used preferably include sulfates, nitrates and chlorides of the metals. For example, a transition metal solution can be used preferably that has a composition in which nickel sulfate, cobalt sulfate and manganese sulfate are dissolved in an aqueous solvent (preferably water).

The above-mentioned $NH_4^+$ ions may be supplied to the transition metal solution in the form of an aqueous solution containing $NH_4^+$ ions (typically a water-based solution), may be supplied to the transition metal solution by directly blowing in ammonia gas, or may be supplied by a combination thereof. An aqueous solution containing $NH_4^+$ ions can be prepared by, for example, dissolving a compound capable of serving as an $NH_4^+$ ion source (such as ammonium hydroxide, ammonium nitrate or ammonia gas) in an aqueous solvent. In the present embodiment, $NH_4^+$ ions are supplied in the form of an aqueous ammonium hydroxide solution (namely, ammonia water).

The above-mentioned raw material hydroxide formation step can include a stage in which a transition metal hydroxide is precipitated from the transition metal solution under conditions of a pH of 12 or higher (and typically, pH 12 to pH 14, and for example, pH 12.2 to pH 13) and at an $NH_4^+$ concentration of 25 g/L or less (and typically, 3 g/L to 25 g/L) (nucleation stage). The pH and $NH_4^+$ concentration can be adjusted by suitably balancing the amounts of the ammonia water and alkaline agent (compound having an action that causes a liquid to become alkaline) used. Sodium hydroxide or potassium hydroxide, for example, can be used for the alkaline agent typically in the form of an aqueous solution. In the present embodiment, an aqueous sodium hydroxide solution is used. In the present specification, pH values refer to pH values based on a liquid temperature of 25° C.

The above-mentioned raw material hydroxide formation step can further include a stage in which cores (typically, particulate) of the transition metal hydroxide precipitated in the above-mentioned nucleation stage are grown at a pH below 12 (typically, pH 10 to lower than pH 12, preferably pH 10 to pH 11.8, and for example, pH 11 to pH 11.8) and an $NH_4^+$ concentration of 3 g/L or more (typically, 3 g/L to 25 g/L) (particle growth stage). Normally, the pH of the particle growth stage is 0.1 or more (typically 0.3 or more, preferably 0.5 or more, and for example, about 0.5 to 1.5) lower than the pH of the nucleation stage. The pH and $NH_4^+$ concentration can be adjusted in the same manner as in the nucleation stage. By carrying out this particle growth stage so as to satisfy the above-mentioned pH and $NH_4^+$ concentration, and making the $NH_4^+$ concentration at the above-mentioned pH to preferably be within the range of 15 g/L or less (for example, 1 g/L to 15 g/L and typically 3 g/L to 15 g/L) and more preferably within the range of 10 g/L or less (for example, 1 g/L to 10 g/L, and typically 3 g/L to 10 g/L), the precipitation rate of the transition metal hydroxide (here, a complex hydroxide containing Ni, Co and Mn) increases, and raw material hydroxide particles can be formed that are suitable for forming any of the holed hollow active material particles disclosed herein (or in other words, raw material hydroxide particles that easily form a fired product having a holed hollow structure). The above-mentioned $NH_4^+$ concentration may also be made to be 7 g/L or less (for example, 1 g/L to 7 g/L and more preferably 3 g/L to 7 g/L). The $NH_4^+$ concentration in the particle growth stage may be, for example, roughly equal to the $NH_4^+$ concentration in the nucleation stage or may be lower than the $NH_4^+$ concentration in the nucleation stage. The precipitation rate of the transition metal hydroxide can be determined by, for example, investigating the change in the total number of moles of transition metal ions contained in the liquid phase of the reaction solution relative to the total number of moles of transition metal ions contained in the transition metal solution supplied to the reaction solution.

The temperature of the reaction solution in each of the nucleation stage and particle growth stage is preferably controlled to a nearly constant temperature (for example, a prescribed temperature ±1° C.) within a range of roughly 30° C. to 60° C. The temperatures of the reaction solutions in the nucleation stage and the particle growth stage may be the same. In addition, the atmosphere in the reaction solutions and the reaction tanks is preferably maintained at a non-oxidizing atmosphere throughout the nucleation stage and the particle growth stage. In addition, the total number of moles of Ni ions, Co ions and Mn ions contained in the reaction solution (total ion concentration) is made to be, for example, roughly 0.5 mol/L to 2.5 mol/L, and preferably about 1.0 mol/L to 2.2 mol/L, throughout the nucleation stage and the particle growth stage. Transition metal solution may be replenished (typically, supplied continuously) according to the precipitation rate of the transition metal hydroxide so as to maintain this total ion concentration. The amounts of Ni ions, Co ions and Mn ions contained in the reaction solution are preferably set to a quantity ratio that corresponds to the composition of the target active material particles (namely, the molar ratio of Ni, Co and Mn in the LiNiCoMn oxide that composes the active material particles).

In the present embodiment, the transition metal hydroxide particles (here, complex hydroxide particles containing Ni, Co and Mn) formed in the manner described above are separated from the reaction solution, washed and dried. An unfired mixture is then prepared by mixing the transition metal hydroxide particles and a lithium compound at a desired quantity ratio (mixing step). In this mixing step, the Li compound and the transition metal hydroxide particles are typically mixed at a quantity ratio corresponding to the composition of the target active material particles (namely, the molar ratio of Li, Ni, Co and Mn in the LiNiCoMn oxide that composes the active material particles). Examples of the lithium compound that can be used preferably include Li compounds such as lithium carbonate or lithium hydroxide that can become oxides as a result of melting with heat.

The above-mentioned mixture is then fired to obtain active material particles (calcining step). This calcining step is typically carried out in an oxidizing atmosphere (for example, in the air). The calcining temperature in this calcining step can be, for example, 700° C. to 1100° C. The calcining step is preferably carried out so that the maximum calcining temperature is 800° C. or higher (preferably 800° C. to 1100° C. and for example, 800° C. to 1050° C.). As a result of the maximum calcining temperature being within these ranges, a sintering reaction of primary particles of a lithium transition metal oxide (preferably an Ni-containing Li oxide and here, an LiNiCoMn oxide) can be allowed to proceed suitably.

In a preferable aspect thereof, the calcining step is carried out in an aspect that includes a first calcining stage, in which the mixture is fired at a temperature T1 of 700° C. to 900° C. (namely, 700° C.≦T1≦900° C., for example, 700° C.≦T1≦800° C., and typically 700° C.≦T1≦800° C.), and a second calcining stage, in which the result of the first calcining stage is fired at a temperature T2 of 800° C. to 1100° C. (namely, 800° C.≦T2≦1100° C., and for example, 800° C.≦T2≦1050° C.). As a result, active material particles having a holed hollow structure can be formed more efficiently. T1 and T2 are preferably set such that T1<T2.

The first calcining stage and the second calcining stage may be carried out continuously (by, for example, holding the mixture at the first calcining temperature T1 following raising the temperature of the mixture to the second calcining temperature T2 and holding at that calcining temperature T2), or after having held at the first calcining temperature T1, the mixture may be temporarily cooled (by, for example, cooling to room temperature) and then supplying the mixture to the second calcining stage after having crushed and sieved the mixture as necessary.

In the technology disclosed herein, the first calcining stage can be understood to be a stage during which calcining is carried out at the temperature T1 that is within a temperature range at which the sintering reaction of the target lithium transition metal oxide progresses, is equal to or lower than the melting point thereof, and is lower than that of the second calcining stage. In addition, the second calcining stage can be understood to be a stage at which calcining is carried out at a temperature T2 that is within a temperature range at which the sintering reaction of the target lithium transition metal oxide progresses, is equal to or lower than the melting point thereof, and is higher than that of the first calcining stage. A temperature difference of 50° C. or more (typically 100° C. or more, and for example, 150° C. or more) is preferably provided between T1 and T2.

The technology disclosed herein is characterized by using the active material particles having a holed hollow structure as described above as a positive electrode active material. Thus, there are no particular limitations on the material, shape and so forth of other battery constituents provided the object of the present invention is able to be realized, and that similar to a conventional lithium secondary battery (and typically, a lithium ion battery) can be used. Examples of a preferable aspect of using the above-mentioned positive electrode active material include a positive electrode having a configuration in which a positive electrode mixture mainly composed of the positive electrode active material (namely, composes 50% by weight or more and typically composes 75% by weight or more) is retained on a current collector, and a lithium secondary battery provided with that positive electrode.

An electrically conductive metal material such as aluminum can be preferably employed for the constituent material of the above-mentioned current collector (positive electrode current collector) in the same manner as a conventional, ordinary lithium secondary battery. There are no particular limitations on the shape of the positive electrode current collector since the shape can vary corresponding to the shape and the like of the battery constructed using the above-mentioned positive electrode, and the shape can be various shapes such as that of a rod, plate, sheet, foil or mesh. The technology disclosed herein can be preferably applied to a positive electrode for a lithium secondary battery of a form in which a layer of a positive electrode mixture is provided on a sheet-shaped or foil-shaped current collector, and to a lithium secondary battery having the positive electrode as a constituent thereof. An example of a preferable aspect of this lithium secondary battery is a battery having a configuration in which an electrode body obtained by winding a sheet-shaped positive electrode and negative electrode with sheet-shaped separators (wound electrode body) is housed in an outer case together with a suitable non-aqueous electrolyte (and typically, an electrolyte in the form of a liquid, or in other words, an electrolyte solution). There are no particular limitations on the external form of the battery, and can have, for example, a rectangular form, flat form or cylindrical form.

The positive electrode mixture can contain the active material particles having a holed hollow structure disclosed herein as well as other arbitrary components such as an electrically conductive material or binder as necessary. An electrically conductive material similar to electrically conductive materials used in the positive electrodes of ordinary lithium secondary batteries can be suitably employed for the above-mentioned electrically conductive material. Examples of this electrically conductive material include carbon materials such as carbon powder or carbon fibers, and electrically conductive metal powders such as nickel powder. One type of material selected from these electrically conductive materials may be used alone or two or more types may be used in combination. Examples of carbon powder that can be used include various types of carbon black (such as acetylene black, furnace black or Ketjen black) and graphite powder. Among these, acetylene black and/or furnace black can be used preferably.

The ratio of the positive electrode active material in the entire positive electrode mixture is preferably about 50% by weight or more (and typically 50 to 95% by weight), and normally the ratio is more preferably roughly 70 to 95% by weight (for example, 75 to 90% by weight). In addition, the ratio of the electrically conductive material in the entire positive electrode mixture can be, for example, roughly 2 to 20% by weight, and normally the ratio is preferably roughly 2 to 15% by weight. In a composition that uses a binder, the ratio of the binder in the entire positive electrode mixture can be, for example, roughly 1 to 10% by weight, and normally the ratio is preferably roughly 2 to 5% by weight.

The technology disclosed herein can be carried out in an aspect that combines the use of active material particles having a holed hollow structure with other particulate or non-particulate active materials (such as active material particles having a typical dense structure). For example, effects resulting from the use of the holed hollow active material particles can be demonstrated by using the active material particles having a holed hollow structure for 5% by weight or more of all active materials provided in one of the electrodes. Normally, the holed hollow active material particles are suitably used at roughly 10% by weight or more (preferably roughly 25% by weight or more, and for example, 50% by weight or more). The holed hollow active material particles are more preferably used at 75% by weight or more (for example, 90% by weight or more) of all of the active material. In a preferable aspect thereof, the holed hollow active material particles account for all of the active material provided in one of the electrodes (typically, the positive electrode).

The procedure used to form a positive electrode mixture layer on a positive electrode current collector may consist of, for example, acquiring (such as by purchasing or preparing) a positive electrode mixture composition of a form in which the above-mentioned positive electrode active material and other arbitrary components (such as an electrically conductive material and binder) are suitably dispersed in a solvent, and applying (typically, coating) the composition (typically a composition in the form of a paste or slurry) to the surface of the current collector, followed by drying. Any aqueous solvent or non-aqueous solvent can be used for the solvent. A preferable example of a non-aqueous solvent is N-methyl-2-pyrrolidone (NMP).

A binder similar to binders used in the positive electrode of an ordinary lithium secondary battery can be suitably employed for the above-mentioned binder. A polymer that can be dispersed or dissolved in the solvent used is preferably selected. In a positive electrode mixture composition that uses an aqueous solvent, for example, a water-soluble or water-dispersible polymer can be used preferably, examples of which include a cellulose-based polymer such as carboxymethyl cellulose (CMC) or hydroxypropyl methyl cellulose (HPMC), polyvinyl alcohol (PVA), a fluorine-based resin such as polytetrafluoroethylene (PTFE) or tetrafluoroethylene-hexafluoropropylene copolymer (FEP), a vinyl acetate copolymer, and rubbers such as styrene butadiene rubber (SBR) or acrylic acid-modified SBR resin (SBR latex). In addition, in a positive electrode mixture composition that uses a non-aqueous solvent, a polymer such as polyvinylidene fluoride (PVDF) or polyvinylidene chloride (PVDC) can be used preferably. The above-mentioned examples of polymer materials can also be used for the purpose of demonstrating a function as a thickener or other additive in the above-mentioned composition in addition to functioning as a binder.

The procedure for applying the positive electrode mixture composition to a sheet-shaped current collector can be preferably carried out by using a conventionally known suitable coating device (such as a slit coater, die coater, comma coater or gravure coater). After coating a suitable amount of the positive electrode mixture composition over a prescribed range of at least one side (typically, both sides) of the current collector and drying, a sheet-shaped positive electrode having target physical properties (positive electrode sheet) is obtained by pressing in the direction of thickness as necessary. Examples of methods that can be suitably used to carry out the pressing described above include conventionally known roll pressing methods and plate pressing methods.

The following provides an explanation of several embodiments of a lithium ion battery obtained by using the active material particles having a holed hollow structure disclosed herein in a positive electrode while referring to the drawings.

First Embodiment

A schematic representation of the configuration of a lithium ion battery according to the present embodiment is shown in FIG. 1. This lithium ion battery 10 has a configuration in which an electrode body 11 provided with a positive electrode 12 and a negative electrode 14 is housed in a battery case 15 having a shape capable of housing the electrode body together with a non-aqueous electrolyte solution not shown. The battery case 15 is provided with a bottomed cylindrical case body 152 and a lid 154 that covers the above-mentioned opening. The lid 154 and the case body 152 are both made of metal, are mutually insulated, and are electrically connected to the current collectors 122 and 142 of the positive electrode and negative electrode, respectively. Namely, in this lithium ion battery 10, the lid 154 also serves as a positive electrode terminal, while the case body 152 also serves as a negative electrode terminal.

The electrode body 11 is formed by superimposing the positive electrode (positive electrode sheet) 12, in which a positive electrode mixture layer 124 containing any of the positive electrode active materials disclosed herein on the long, sheet-shaped positive electrode current collector 122, and the negative electrode (negative electrode sheet) 14, having a negative electrode mixture layer 144 on the long, sheet-shaped negative electrode current collector (such as copper foil) 142, with two separators 13 in the form of long sheets and winding into a cylindrical shape.

One type or two or more types of materials conventionally used in lithium ion batteries can be used without limitation for the negative electrode active material that composes the negative electrode mixture layer 144. Preferable examples of these materials include granular carbon materials (carbon powder) containing a graphite structure (layered structure) in at least a portion thereof. Carbon materials having a so-called graphitic structure (graphite), non-graphitizable carbonaceous structure (hard carbon), graphitizable carbonaceous structure (soft carbon) or combination thereof are used preferably. For example, graphite particles such as natural graphite particles can be used preferably.

The negative electrode mixture layer 144 can be formed at a desired location on the negative electrode current collector 142 by coating a negative electrode mixture composition, typically obtained by mixing a binder (a binder similar to that of the mixture layer on the side of the positive electrode can be used) and an electrically conductive material used as necessary (an electrically conductive material similar to that of the mixture layer on the side of the positive electrode can be used), onto the current collector 142 and drying. Although there are no particular limitations thereon, the ratio of negative electrode active material in the entire negative electrode mixture can be roughly 80% by weight or more (for example, 80 to 99% by weight), and preferably roughly 90% by weight or more (for example, 90 to 99% by weight, and more preferably 95 to 99% by weight). In a composition that uses a binder, the ratio of the binder in the entire negative electrode mixture can be, for example, roughly 0.5 to 10% by weight, and normally the ratio is preferably roughly 1 to 5% by weight.

A material similar to that used in conventional lithium ion batteries can be used for the separators 13 used by superimposing with the positive and negative electrodes sheets 12 and 14. For example, a porous resin sheet (film) composed of a polyolefin-based resin such as polyethylene or polypropylene can be used preferably.

A portion where the positive electrode current collector 122 is exposed without being provided with the positive electrode mixture layer (positive electrode mixture layer non-formed portion) is provided on one edge along the lengthwise direction of the current collector 122. Similarly, a portion where the negative electrode current collector 142 is exposed without being provided with the negative electrode mixture layer (negative electrode mixture layer non-formed portion) is provided on one edge along the lengthwise direction of the current collector 142. As shown in FIG. 1, the positive and negative electrodes 12 and 14 are superimposed while being slightly shifted out of position in the direction of width so that together with superimposing both of the mixture layers 124 and 144, the mixture layer non-formed portions of both electrode sheets respectively protrude from one end and the other end of the separators 13 along the lengthwise direction thereof. The lid 154 and the case body 152 are respectively connected to these protruding portions.

An electrolyte solution similar to non-aqueous electrolyte solutions conventionally used in a lithium ion battery can be used for the electrolyte solution without any particular limitations. This non-aqueous electrolyte solution typically has a composition in which a supporting salt is contained in a suitable non-aqueous solvent. One type or two or more types of non-aqueous solvents selected from the group consisting of for example, ethylene carbonate (EC), propylene carbonate (PC), dimethyl carbonate (DMC), diethyl carbonate (DEC), ethyl methyl carbonate (EMC), 1,2-dimethoxyethane, 1,2-diethoxyethane, tetrahydrofuran and 1,3-dioxolane can be used for the above-mentioned non-aqueous solvent. In addition, a lithium salt such as $LiPF_6$, $LiBF_4$, $LiAsF_6$, $LiCF_3SO_3$, $LiC_4F_9SO_3$, $LiN(CF_3SO_2)_2$ or $LiC(CF_3SO_2)_3$ can be used for the above-mentioned supporting salt (supporting electrolyte).

Second Embodiment

Figure 2:
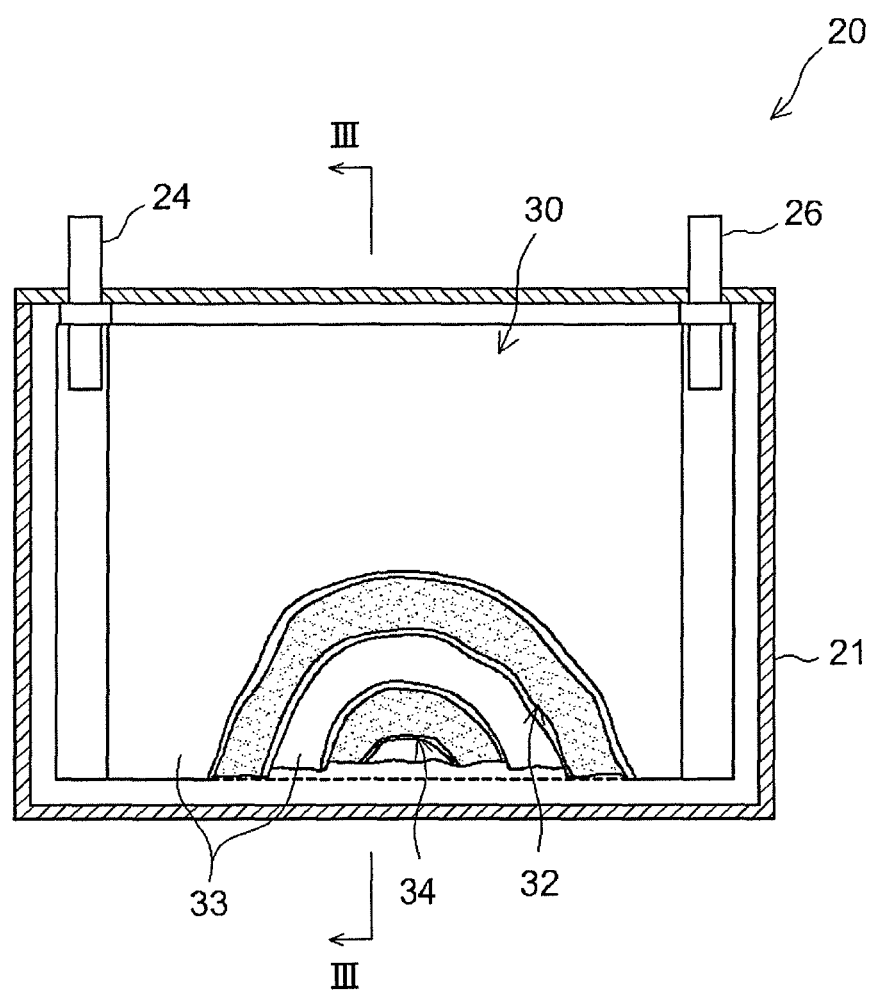
FIG. 2 is a partial cross-sectional view schematically showing the configuration of a prismatic lithium secondary battery according to an embodiment.
Figure 3:
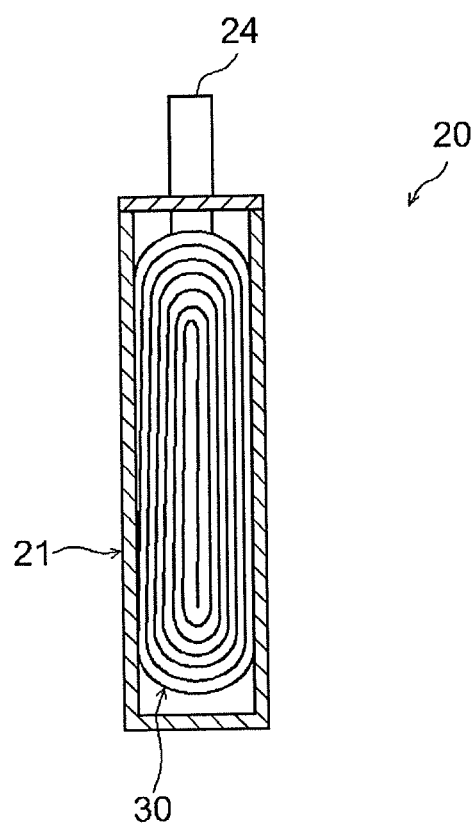
FIG. 3 is a cross-sectional view taken along line III-III of FIG. 2.

Schematic representations of the configuration of a lithium ion battery according to the present embodiment are shown in FIGS. 2 and 3. This lithium ion battery 20 is provided with a flat prismatic container 21 (typically made of metal, but may also be made of resin). A wound electrode body 30 is housed in this container 21. The electrode body 30 of the present embodiment is formed into a flat shape that matches the shape of the container 21 by superimposing a positive electrode sheet 32, a negative electrode sheet 34 and two separators 33, obtained by using the same materials as in the first embodiment, so that mixture layer non-formed portions of both of the electrode sheets 32 and 34 respectively protrude from one end and the other end of the separators 33 along the lengthwise direction thereof, followed by winding and flattening the resulting wound body by pressing from the side.

A positive electrode terminal 24 and a negative electrode terminal 26 for connecting to the outside are electrically connected to the electrode sheets 32 and 34. These connections can be preferably carried out by respectively gathering the portions of the positive electrode mixture layer non-formed portions of both electrode sheets 32 and 34 that protrude from the separators 33 in the radial direction of the wound electrode body 30, and respectively connecting (such as by welding) the positive electrode terminal 24 and the negative electrode terminal 26 to the gathered portions. The lithium ion battery 20 according to the present embodiment is constructed by housing the electrode body 30 to which the terminal 24 and 26 have been connected in the container 21, supplying a suitable non-aqueous electrolyte solution (the same electrolyte solution as that of the first embodiment can be used) to the inside thereof, and sealing the container 21.

Third Embodiment

Figure 4:
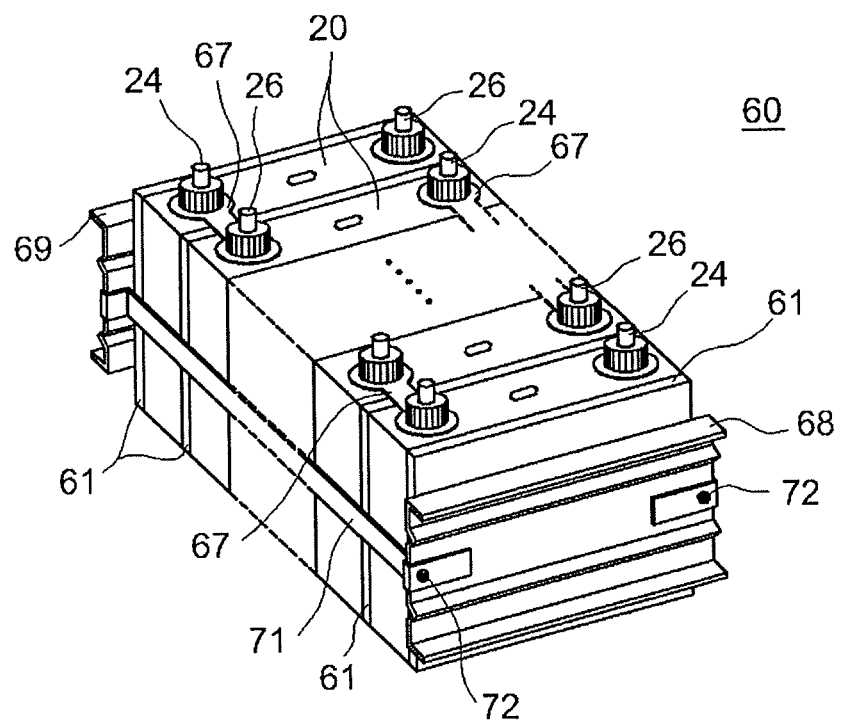
FIG. 4 is a partial cross-sectional view schematically showing the configuration of an assembled battery according to an embodiment.

A schematic representation of the configuration of an assembled battery according to the present embodiment is shown in FIG. 4. This assembled battery 60 is constructed using a plurality of the battery 20 according to the second embodiment (by typically using 10 or more batteries, preferably 10 batteries to 30 batteries, and for example, 20 batteries). These batteries (cells) 20 are arranged in opposition to the wide surfaces of the container 21 (namely, those surfaces corresponding to the flat sides of the wound electrode body 30 housed in the container 21) while respectively inverting in turn so that each of the positive electrode terminals 24 and negative electrode terminals 26 are alternately arranged. Cooling plates 61 of a prescribed shape are arranged while pressed against the wide surfaces of the container 21 between the arranged cells 20 and on both outsides in the direction in which the cells are arranged (direction of lamination). These cooling plates 61 function as heat radiating members for efficiently dissipating heat generated in each of the cells during use, and have a shape that enables a cooling fluid (typically, air) to be introduced between the cells 20 (for example, a plurality of parallel grooves are provided in the surfaces of the cooling plates 61 from one side of the cooling plates 61 in the lengthwise direction thereof to the opposing side extending vertically there from). The cooling plates 61 are preferably made from a metal having favorable thermal conductivity or from polypropylene or other synthetic resin that is both lightweight and hard.

A pair of end plates 68 and 69 are arranged farther to the outside of those cooling plates 61 arranged on both outsides of the cells 20 and cooling plates 61 arranged in the manner described above (to be generally referred to as a "cell group"). The entire assembly, including the cell group, in which the cells 20 are arranged in the direction of lamination, and the end plates 68 and 69 (to be referred to as a "constrained body"), is constrained by a prescribed constraint pressure P in the direction of lamination of the constrained body (namely, in the horizontal direction with respect to the axis of the wound electrode body 30) by a clamping band 71 attached to bridge between both of the end plates 68 and 69. More specifically, the constrained body is constrained by fastening and fixing the ends of the clamping band 71 to the end plate 68 with screws 72 so that the prescribed constraint pressure P is applied in the direction of lamination (for example, so that the constraint pressure P is about 0.1 MPa to 10 MPa as the contract pressure acting on the wide surfaces of the container 21). The positive electrode terminal 24 and the negative electrode terminal 26 are then electrically connected by connectors 67 between adjacent cells 20. As a result of connecting each of the cells 20 in series in this manner, the assembled battery 60 is constructed having a desired voltage.

Although the following provides an explanation of several experimental examples relating to the present invention, the present invention is not intended to be limited by the contents indicated in these specific examples.

<Production of Active Material Particles Having Holed Hollow Structure (Samples 1 to 12)>

Deionized water was placed in a reaction tank set to an internal temperature of 40° C., nitrogen gas was allowed to flow through the reaction tank while stirring, and together with purging the dissolved gas in deionized water by nitrogen, the inside of the reaction tank was adjusted to a non-oxidizing atmosphere having an oxygen gas ($O_2$) concentration of 2.0%. Next, 25% aqueous sodium hydroxide solution and 25% ammonia water were added so that the pH measured based on a liquid temperature of 25° C. became 12.5 and the $NH_4^+$ concentration in the liquid became 5 g/L.

Nickel sulfate, cobalt sulfate and manganese sulfate were dissolved in water so that the molar ratio of Ni:Co:Mn was 0.33:0.33:0.33 and the total molar concentration of these metal elements was 1.8 mol/L to prepare a mixed aqueous solution. As a result of supplying this mixed aqueous solution, the 25% aqueous NaOH solution and the 25% ammonia water to the above-mentioned reaction tank at a constant rate, NiCoMn complex hydroxide was precipitated from the reaction solution while controlling the pH of the reaction solution to 12.5 and controlling the $NH_4^+$ concentration to 5 g/L (nucleation stage).

After waiting for 2 minutes 30 seconds to elapse after starting the supply of the mixed aqueous solution, the supply of the 25% aqueous NaOH solution was stopped. The mixed aqueous solution and the 25% ammonia water were continued to be supplied at a constant rate. After the pH of the reaction solution had dropped to 11.6, supply of the 25% aqueous NaOH solution was resumed. The procedure of supplying the mixed aqueous solution, the 25% aqueous NaOH solution and the 25% ammonia water while controlling the reaction solution to pH 11.6 and an $NH_4^+$ concentration of 5 g/L was continued for 4 hours to grow NiCoMn complex hydroxide particles (particle growth stage). Subsequently, the product was removed from the reaction tank, rinsed with water and dried. In this manner, complex hydroxide particles were obtained that had the composition represented by the formula $Ni_{0.33}Co_{0.33}Mn_{0.33}(OH)_{2+\alpha}$ (where, $\alpha$ in the formula is such that $0 \leq \alpha \leq 0.5$).

Heat treatment was carried out on the above-mentioned complex hydroxide particles in an air atmosphere for 12 hours at 150° C. Next, $Li_2CO_3$ as a lithium source and the complex hydroxide particles were mixed so that the ratio ($M_{Li}:M_{Me}$) of the number of moles of lithium ($M_{Li}$) and the total number of moles ($M_{Me}$) of the Ni, Co and Mn composing the complex hydroxide was 1.15:1. This mixture was then fired for 4 hours at 760° C. (first calcining stage) followed by calcining for 10 hours at 950° C. (second calcining stage). Subsequently, the fired product was crushed and sieved. In this manner, an active material particle sample was obtained having a composition represented by the formula $Li_{1.15}Ni_{0.33}Co_{0.33}Mn_{0.33}O_2$.

Active material particles of samples 1 to 12 having the average particle diameters ($D_{50}$) and BET specific surface areas shown in Table 1 were fabricated by adjusting conditions such as pH and $NH_4^+$ concentration in the active material particle sample fabrication process described above, and more specifically, by varying the pH in the nucleation stage from 12 to 13 and varying the $NH_4^+$ concentration in the particle growth stage from 3 g/L to 10 g/L. When the average hardness of these active material particle samples was measured according to the previously described method, all of the samples were confirmed to have an average hardness within the range of 0.5 MPa to 10 MPa.

Figure 5:
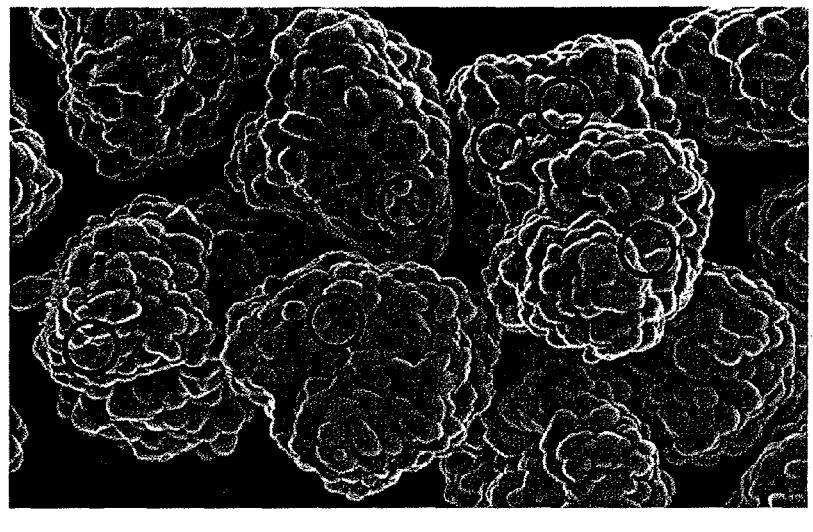
FIG. 5 is a surface SEM micrograph showing an example of active material particles having a holed hollow structure.

The active material particles of samples 1 to 12 were observed by surface SEM. As a result, in all the active material particle samples, several through holes were confirmed to have been formed in secondary particles consisting of an aggregate of primary particles, while the primary particles were confirmed to be densely sintered at portions other than the through holes. A surface SEM image of sample 8 is shown in FIG. 5 as an example thereof. In FIG. 5, the encircled portions indicate those locations where through holes were observed to be present in this SEM image.

<Production of Active Material Particles Having a Porous Structure (Samples 13 and 14)>

Lithium nitrate, nickel nitrate, cobalt nitrate and manganese nitrate were dissolved in water so that the molar ratio of Li:Ni:Co:Mn became 1.15:0.33:0.33:0.33 and the total molar concentration of these metal elements became 1.5 mol/L to prepare a mixed aqueous solution.

A mist of this mixed aqueous solution was then introduced into a heating oven at 700° C. to induce thermal decomposition and obtain complex oxide particles having the composition represented by the formula $Li_{1.15}Ni_{0.33}Co_{0.33}Mn_{0.33}O_2$ (spray thermal decomposition method). These particles were then heated (annealed) for 10 hours at 950° C. to obtain active material particles of samples 13 and 14 having the average particle diameters, specific surface areas and average hardnesses shown in Table 1. Samples 13 and 14 were produced by mutually varying the average droplet size of the above-mentioned mist.

The resulting active material particle samples 13 and 14 were measured for average particle diameter and specific surface area in the same manner as samples 1 to 12. In addition, the appearances of these samples were observed with the above-mentioned scanning electron microscope. As a result, both of the samples were confirmed to have a porous structure in which a large number of pores were present in the particle surface. In addition, when the average hardness of these active material particles was measured according to the previously described method, average hardness was confirmed to be within the range of 0.05 MPa to 0.1 MPa in both cases.

<Production of Active Material Particles Having a Solid Structure (Samples 15 to 21)>

Deionized water was placed in a reaction tank equipped with an overflow pipe and set to an internal temperature of 40° C., nitrogen gas was allowed to flow through the reaction tank while stirring, and together with replacing the deionized water with nitrogen, the inside of the reaction tank was adjusted to a non-oxidizing atmosphere having an oxygen gas ($O_2$) concentration of 2.0%. Next, 25% aqueous sodium hydroxide solution and 25% ammonia water were added so that the pH as measured based on a liquid temperature of 25° C. was 12.0 and the $NH_4^+$ concentration in the liquid was 15 g/L.

Nickel sulfate, cobalt sulfate and manganese sulfate were dissolved in water so that the molar ratio of Ni:Co:Mn was 0.33:0.33:0.33 and the total molar concentration of these metal elements was 1.8 mol/L to prepare a mixed aqueous solution. This mixed aqueous solution, the 25% aqueous NaOH solution and the 25% ammonia water were supplied to the reaction tank at a constant rate at which the average retention time of the NiCoMn complex hydroxide particles that precipitated in the reaction tank was 10 hours, the NiCoMn complex hydroxide particles were continuously precipitated by controlling conditions so that the pH of the reaction solution was 12.0 and the $NH_4^+$ concentration was 15 g/L, and after bringing the inside of the reaction tank to a steady state, the NiCoMn complex hydroxide (product) was continuously sampled from the above-mentioned overflow pipe, rinsed with water and dried. In this manner, complex hydroxide particles were obtained that had the composition represented by the formula $Ni_{0.33}Co_{0.33}Mn_{0.33}(OH)_{2+\alpha}$ (where, α in the formula is such that $0 \leq \alpha \leq 0.5$).

Heat treatment was carried out on the above-mentioned complex hydroxide particles in an air atmosphere for 12 hours at 150° C. Next, $Li_2CO_3$ as a lithium source and the complex hydroxide particles were mixed so that the ratio ($M_{Li}:M_{Me}$) of the number of moles of lithium ($M_{Li}$) and the total number of moles ($M_{me}$) of the Ni, Co and Mn composing the complex hydroxide was 1.15:1. This mixture was then fired for 4 hours at 760° C. followed by calcining for 10 hours at 950° C. Subsequently, the fired product was crushed and sieved. In this manner, an active material particle sample was obtained having a composition represented by the formula $Li_{1.15}Ni_{0.33}Co_{0.33}Mn_{0.33}O_2$.

Active material particles of samples 15 to 21 having the average particle diameters ($D_{50}$) and BET specific surface areas shown in Table 1 were fabricated by adjusting conditions such as retention time and pH in the active material particle sample fabrication process described above. The average particle diameters and specific surface areas were measured for the resulting active material particle samples 15 to 21 in the same manner as samples 1 to 12. In addition, the appearances of these samples were observed using the above-mentioned scanning electron microscope. As a result, all of the samples were confirmed to have a dense structure. In addition, when the average hardnesses of these active material particle samples were measured according to the previously described method, all of the measured values were confirmed to be within the range of 5 MPa to 30 MPa.

<Fabrication of Positive Electrode Sheets>

The active material particle samples described above, acetylene black used as an electrically conductive material and PVDF were mixed with NMP so that the weight ratio of these materials became 85:10:5 and the solid content concentration (NV) became about 50% by weight to prepare positive electrode mixture compositions corresponding to each of the active material particle samples.

These positive electrode mixture compositions were then coated onto both sides of a long piece of aluminum foil (current collector) having a thickness of 15 μm. The coated amounts of the above-mentioned compositions (based on the solid content) were adjusted to be a combined total of about 12.8 mg/cm² for both sides. After drying the coated layers, roll-press was conducted to obtain sheet-shaped positive electrodes (positive electrode sheets) having a positive electrode mixture layer on both sides of the current collector. The total thickness of the positive electrode sheets was about 70 μm. In this manner, a total of 21 types of positive electrode sheets were fabricated corresponding to each of the active material particle samples.

Figure 6:
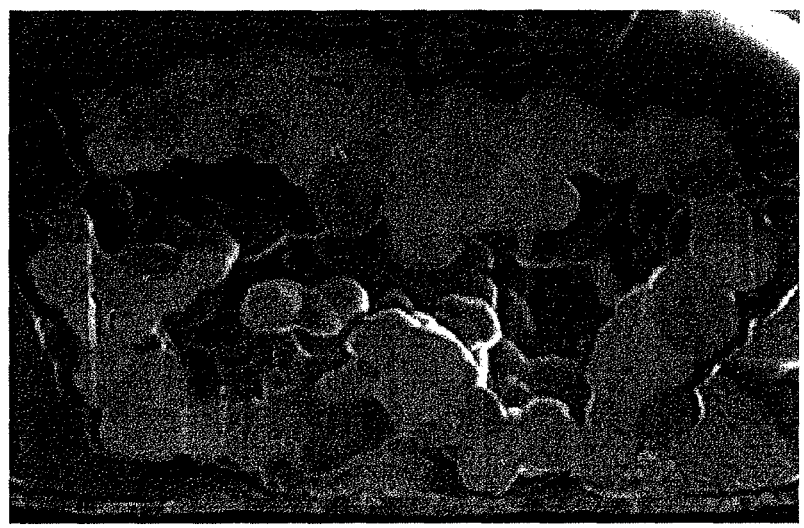
FIG. 6 is a cross-sectional SEM micrograph showing an example of active material particles having a holed hollow structure.

The positive electrode sheets were then cut in the direction of thickness, and the cross-sectional surfaces were polished by cross-sectional polishing using an argon ion beam followed by observing the cross-sections with a scanning electron microscope as previously described. The average opening size of the through holes in each sample was determined from the results of those observations. Those results are shown in Table 1. In addition, the average number of through holes as determined from the above-mentioned observation results were found to be 1 through hole to 10 through holes per particle for each of the samples 1 to 12. During observation of the cross-sections of each of the samples, 50% or more of the through holes were confirmed to penetrate the secondary particles nearly vertically from the outside to the hollow portion thereof and connect the outside of the active material particles with the hollow portion with a straight line that passes through the through holes. In addition, primary particles composing the secondary particles were confirmed to be densely sintered at locations other than those of hollow portions and through holes in each of the samples. A cross-sectional SEM micrograph of sample 8 is shown in FIG. 6 as one example thereof.

TABLE 1

| Sample | Particle structure | Avg. particle diameter (μm) | BET specific surface area (m²/g) | Average opening size (μm) | Average no. of through holes | Average hardness (MPa) |
|---|---|---|---|---|---|---|
| 1 | Holed hollow | 7.8 | 0.62 | 0.31 | 1 to 10 | 0.5 to 10 |
| 2 | ↑ | 3.6 | 0.87 | 0.02 | | |
| 3 | ↑ | 7.9 | 0.89 | 0.72 | | |
| 4 | ↑ | 5.9 | 1.02 | 0.56 | | |
| 5 | ↑ | 3.4 | 1.17 | 0.03 | | |
| 6 | ↑ | 8.1 | 1.24 | 1.78 | | |
| 7 | ↑ | 5.7 | 1.28 | 0.05 | | |
| 8 | ↑ | 4.8 | 1.29 | 0.55 | | |
| 9 | ↑ | 3.5 | 1.41 | 0.34 | | |
| 10 | ↑ | 6.2 | 1.45 | 1.32 | | |
| 11 | ↑ | 4.9 | 1.48 | 1.02 | | |
| 12 | ↑ | 3.6 | 1.84 | 0.22 | | |
| 13 | Porous | 3.3 | 1.92 | — | — | 0.05 to 0.1 |
| 14 | ↑ | 5.6 | 2.01 | — | — | |
| 15 | Dense | 6.1 | 0.43 | — | — | 5 to 30 |
| 16 | ↑ | 7.8 | 0.45 | — | — | |
| 17 | ↑ | 8.3 | 0.55 | — | — | |
| 18 | ↑ | 5.8 | 0.75 | — | — | |
| 19 | ↑ | 3.2 | 0.88 | — | — | |
| 20 | ↑ | 3.5 | 1.02 | — | — | |
| 21 | ↑ | 5.7 | 1.02 | — | — | |

<Fabrication of Lithium Ion Batteries>

Natural graphite particles, SBR and CMC were mixed with deionized water so that the weight ratio of these materials was 98:1:1 and NV was 45% by weight to prepare an aqueous active material composition (negative electrode mixture composition). This composition was then coated onto both sides of a long piece of copper foil (negative electrode current collector) having a thickness of about 10 μm followed by drying and roll-pressing. In this manner, a sheet-shaped negative electrode (negative electrode sheet) was fabricated having a negative electrode mixture layer on both sides of the current collector. The total thickness of the negative electrode sheet was about 50 μm.

Each of positive electrode sheets and negative electrode sheets fabricated in the manner previously described were laminated with two long separators (here, porous polyethylene sheets were used having a thickness of 20 μm), and the laminated sheets were then wound in lengthwise direction to fabricate wound electrode bodies. Each electrode body was housed in an outer case together with a non-aqueous electrolyte solution to construct 18650 lithium ion batteries. The composition of the non-aqueous electrolyte solution used was obtained by dissolving $LiPF_6$ in a mixed solvent containing EC, DMC and EMC at a volume ratio of 3:3:4 to a concentration of 1 mol/L. Subsequently, initial charge-discharge processing was carried out on each of the batteries constructed in the manner described above, comprising repeating two to three times a procedure consisting of charging at a constant current for 3 hours at a charge rate of 1/10 C and then further charging at a constant current at a charge rate of 1/3 C to a voltage of 4.1 V, and a procedure consisting of discharging at a constant current at a discharge rate of 1/3 C to a voltage of 3.0 V, to obtain a total of 21 types of lithium ion batteries corresponding to each of the active material particle samples. The rated capacity of these batteries was 300 mAh for all batteries.

<Rate of Increase in Resistance Due to High-Rate Cycling>

Each of the batteries fabricated in the manner described above was adjusted to an SOC (state of charge) of 60% followed by discharging at a constant current of 20 C at a temperature of 25° C. to determine the initial IV resistance from the voltage drop.

Next, each of the batteries was again adjusted to an SOC of 60%, and a high-rate cycling test was carried out at 25° C. by repeating 10,000 of the charge-discharge cycles consisting of (I) to (IV) indicated below. During that time, the SOC was adjusted to 60% for every 100 cycles.

(I) Discharging for 10 seconds at a constant current of 20 C (here, 6 A)
(II) Pausing for 5 seconds
(III) Charging for 40 seconds at a constant current of 5 C
(IV) Pausing for 5 seconds IV resistance after the high-rate cycling test was then measured in the same manner as during measurement of initial IV resistance for each of the batteries following completion of the high-rate cycling test. The rate of increase in resistance (multiple) attributable to the high-rate cycling test was then calculated by dividing the IV resistance value after the high-rate cycling test by the initial IV resistance value.

<Low-Temperature Initial Reaction Resistance>

Alternating current impedance of each of the batteries constructed in the manner described above was measured at a measuring temperature of −30° C. and under conditions consisting of a measuring frequency range of 0.001 Hz to 10,000 Hz and an amplitude of 5 mV to determine the direct current resistance Rsol and the reaction resistance Rct (initial reaction resistance) by fitting the data to an equivalent circuit of a Cole-Cole plot.

<Endurance Evaluation>

An endurance cycle test was conducted on the batteries following measurement of low-temperature initial reaction resistance in the manner described above at 60° C. by repeating 500 cycles of constant-current charging at 4 C (1.2 A) and constant-current discharging at 4 C over an SOC range of 0% to 100% (upper limit voltage: 4.1 V, lower limit voltage: 3.0 V). Low-temperature reaction resistance following the endurance cycle was then measured for each of the batteries following completion of the endurance cycle test in the same manner as measurement of low-temperature initial reaction resistance. The rate of increase in resistance (multiple) attributable to the endurance cycle test was then calculated by dividing the reaction resistance value after the endurance cycle by the initial reaction resistance value.

In addition, each of the batteries constructed in the manner described above were charged at a constant current of 1 C to a voltage of 4.1 V under temperature conditions of 25° C. and then charged at a constant voltage until the total charging time reached 2 hours. After holding the batteries at 25° C. for 24 hours following this CC-CV charging, the batteries were discharged at a constant current of 1 C from a voltage of 4.1 V to 3.0 V at 25° C., followed by discharging at a constant voltage until the total discharge time reached 2 hours and then measuring the discharge capacity (initial capacity) at that time. The above-mentioned endurance cycle test was then carried out on the batteries following this measurement of initial capacity. Following the endurance cycle test, the batteries were discharged at a constant current of 1 C from a voltage of 4.1 V to a voltage of 3.0 V at 25° C., followed by discharging at a constant voltage until the total discharge time reached 2 hours and then measuring the discharge capacity (post-cycle capacity) at this time. Capacity retention rate (%) was then determined after 500 cycles of the above-mentioned charge-discharge cycling according to the following formula: {(post-cycle capacity)/(initial capacity)}×100.

The results are shown in Table 2.

TABLE 2

| Sample | Resistance increase rate after high-rate cycling (multiple) | Initial low-temperature reaction resistance (Ω) | After endurance cycle | |
|---|---|---|---|---|
| | | | Low-temperature reaction resistance increase rate (multiple) | Capacity retention rate (%) |
| 1 | 1.55 | 2.23 | 0.97 | 92.1 |
| 2 | 1.38 | 2.11 | 0.99 | 91.7 |
| 3 | 1.44 | 2.15 | 0.98 | 91.8 |
| 4 | 1.32 | 2.01 | 0.99 | 92 |
| 5 | 1.24 | 2.08 | 0.98 | 92.1 |
| 6 | 1.18 | 1.91 | 0.98 | 91.4 |
| 7 | 1.08 | 1.98 | 0.98 | 91.2 |
| 8 | 1.12 | 1.95 | 1.01 | 91.5 |
| 9 | 1.13 | 1.97 | 0.99 | 91.5 |
| 10 | 1.03 | 1.88 | 0.99 | 92.3 |
| 11 | 1.02 | 1.89 | 1 | 91.6 |
| 12 | 1.05 | 1.72 | 1.02 | 91.3 |
| 13 | 3.11 | 1.77 | 2.34 | 79.1 |
| 14 | 3.08 | 1.87 | 2.51 | 76.1 |
| 15 | 3.91 | 3.23 | 1.05 | 91 |
| 16 | 3.71 | 3.56 | 1.04 | 91.1 |
| 17 | 3.22 | 2.89 | 1.01 | 90.3 |
| 18 | 3.78 | 2.25 | 1.03 | 91.4 |
| 19 | 3.21 | 2.31 | 0.99 | 91.5 |
| 20 | 3.35 | 2.23 | 0.98 | 92.1 |
| 21 | 3.82 | 2.33 | 1.01 | 91.8 |

As is shown in Tables 1 and 2, according to the batteries using the active material particles of samples 1 to 12 having a holed hollow structure (but not a porous structure), the rates of increase in resistance were held to 3-fold or less (here, 2-fold or less and more particularly, 1.6-fold or less) even after 10,000 high-rate cycles including high-rate discharge at 20 C. According to samples 6 to 12 in which the BET specific surface area was 1.2 m$^2$/g or more (more particularly, 1.2 m$^2$/g to 1.9 m$^2$/g), the rates of increase in resistance following the high-rate cycling described above were 1.2-fold or less, thereby demonstrating particularly favorable results. In addition, the batteries that used these samples 6 to 12 demonstrated low values for initial reaction resistance at a low temperature (−30° C.) of 2Ω or less in all cases, thereby demonstrating superior output performance (particularly, superior output performance at low temperatures). Moreover, as can be understood from the data on the low-temperature reaction resistance increase rate previously described, the batteries that used active material particles of samples 1 to 12 demonstrates a rate of increase in low-temperature reaction resistance of 5% or less as determined in the above-mentioned endurance cycle test, thus indicating extremely high endurance performance. In addition, capacity retention rates in the above-mentioned endurance test were all favorable at 90% and above.

On the other hand, active material particles having a porous structure (samples 13 and 14) and active material particles having a dense structure (samples 15 to 21) all demonstrated resistance increase as determined by the above-mentioned high-rate cycling of 3-fold or more, thus demonstrating a lack of endurance. In addition, although the active material particles having a porous structure were recognized to demonstrate the effect of lowering initial low-temperature reaction resistance as compared with active material particles having a dense structure, the endurance of that effect was confirmed to be lacking. Namely, batteries using the active material particles of samples 13 and 14 both demonstrated increases in low-temperature reaction resistance as determined with the above-mentioned endurance test of 2-fold or more. Moreover, the capacity retention rates of the batteries according to samples 13 and 14 were less than 80%.

Although the above has provided a detailed explanation of the present invention, the above-mentioned embodiments are merely examples, and the invention disclosed herein includes various alterations and modifications of the previously described specific examples.

INDUSTRIAL APPLICABILITY

Figure 7:
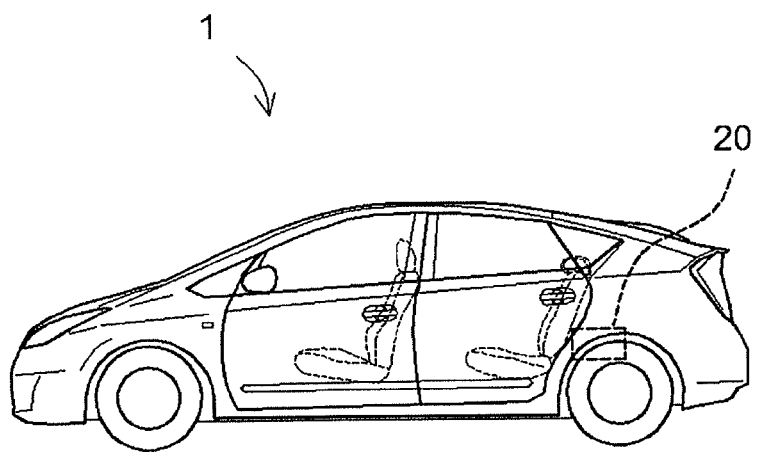
FIG. 7 is a side view schematically showing a vehicle (automobile) equipped with a lithium secondary battery.

As a result of demonstrating superior performance as previously described, the lithium secondary battery provided by the technology disclosed herein can be used as a lithium secondary battery for various applications. For example, the lithium secondary battery of the present invention can be preferably used as a power for a motor installed in a vehicle such as an automobile. This lithium secondary battery may also be used in the form of an assembled battery obtained by connecting a plurality thereof in series and/or in parallel. Thus, according to the technology disclosed herein, a vehicle 1 provided with the lithium secondary battery (which may also be in the form of an assembled battery) 20 as a power supply (and typically, an automobile, and particularly an automobile equipped with a motor in the manner of a hybrid vehicle, electrical vehicle or fuel cell vehicle) is provided as schematically shown in FIG. 7.

| BRIEF DESCRIPTION OF THE REFERENCE SYMBOLS | |
|---|---|
| 1 | Automobile (vehicle) |
| 10 | Lithium ion battery |
| 11 | Electrode body |
| 12 | Positive electrode (positive electrode sheet) |
| 13 | Separator |
| 14 | Negative electrode (negative electrode sheet) |
| 122 | Positive electrode current collector |
| 124 | Positive electrode mixture layer |
| 142 | Negative electrode current collector |
| 144 | Negative electrode mixture layer |
| 20 | Lithium ion battery (cell) |
| 24 | Positive electrode terminal |
| 26 | Negative electrode terminal |
| 30 | Electrode body |
| 32 | Positive electrode sheet |
| 33 | Separator |
| 34 | Negative electrode sheet |
| 60 | Assembled battery |
| 61 | Cooling plate |
| 67 | Connector |
| 68, 69 | End plates |
| 71 | Clamping band |

The invention claimed is:

1. A method of producing active material particles having a holed hollow structure having secondary particles including an aggregate of a plurality of primary particles of a lithium transition metal oxide, and a hollow portion formed inside the secondary particles, with through holes that penetrate to the hollow portion from the outside being formed in the secondary particles, the method comprising:

a raw material hydroxide formation step of supplying ammonium ions to an aqueous solution of a transition metal compound, and precipitating particles of the transition metal hydroxide from the aqueous solution, with the aqueous solution containing at least one transition metal element that composes the lithium transition metal oxide;

a mixing step of mixing the transition metal hydroxide with a lithium compound to prepare an unfired mixture, and a calcining step of calcining the mixture to obtain the active material particles, wherein the raw material hydroxide formation step includes a nucleation stage in which the transition metal hydroxide is precipitated from the aqueous solution at a pH of 12 or higher and an ammonium ion concentration of 25 g/L or less, and a particle growth stage in which the precipitated transition metal hydroxide is grown at a pH of less than 12 and an ammonium ion concentration of 3 g/L or more.

2. The method according to claim 1, wherein the calcining step is carried out such that the maximum calcining temperature is 800° C. to 1100° C.

3. The method according to claim 1, wherein the calcining step includes a first calcining stage, in which the mixture is fired at a temperature T1 of 700° C. to 900° C., and a second calcining stage, in which the result of the first calcining stage is fired at a temperature T2 of 800° C. to 1100° C. that is higher than the firing temperature T1 of the first calcining stage.

4. The method according to claim 1, wherein the particle growth stage is carried out at the ammonium ion concentration of 15 g/L or less.

5. The method according to claim 1, wherein an aqueous solution of a transition metal compound contains nickel.

6. A method according to claim 1, wherein the pH of the particle growth stage is 11.8 or lower.

7. A method according to claim 1, wherein the pH of the particle growth stage is 0.5 or more lower than the pH of the nucleation stage.

8. A method according to claim 1, wherein the calcining step is the step to obtain the active material particles with a BET specific surface area of from 0.5 to 1.9 $m^2/g$.

9. A method according to claim 1, wherein the calcining step is the step to obtain the active material particles with 1 to 20 through holes per particle of the active material particles on average.

10. A method according to claim 1, wherein the average hardness of the active material particles, as obtained by measuring dynamic hardness under conditions of a loading speed of 0.5 mN/sec to 3 mN/sec using a flat diamond indenter having a diameter of 50 μm, is 0.5 MPa or more.

11. A method according to claim 1, wherein, the primary particles that compose the secondary particles are sintered in the calcining step in the portion of the secondary particles that surrounds the hollow portion, with the exception of the portions having the through holes.

* * * * *